(12) United States Patent
Diemer et al.

(10) Patent No.: US 8,151,659 B2
(45) Date of Patent: Apr. 10, 2012

(54) MACHINE TOOL HAVING A TOOL CHECKING DEVICE

(75) Inventors: Willi Diemer, Aalen (DE); Simon Ellinger, Schechingen (DE)

(73) Assignee: Alfing Kessler Sondermaschinen GmbH, Aalen (DE)

(*) Notice: Subject to any disclaimer, the term of this patent is extended or adjusted under 35 U.S.C. 154(b) by 845 days.

(21) Appl. No.: 12/218,930

(22) Filed: Jul. 18, 2008

(65) Prior Publication Data

US 2009/0043418 A1 Feb. 12, 2009

(30) Foreign Application Priority Data

Aug. 8, 2007 (DE) .......................... 10 2007 037 498

(51) Int. Cl.
*G01N 19/00* (2006.01)
(52) U.S. Cl. ...................................................... 73/865.9
(58) Field of Classification Search ........................ None
See application file for complete search history.

(56) References Cited

U.S. PATENT DOCUMENTS

| | | | | |
|---|---|---|---|---|
| 4,120,196 | A | * | 10/1978 | Hamilton et al. ............... 73/104 |
| 4,228,514 | A | * | 10/1980 | Weiss ............................ 702/34 |
| 4,340,326 | A | * | 7/1982 | Buonauro et al. .............. 408/16 |
| 4,502,823 | A | * | 3/1985 | Wronski et al. ............... 409/134 |
| 4,827,435 | A | * | 5/1989 | Marron et al. ................ 702/151 |
| 5,189,625 | A | | 2/1993 | Le Floch |
| 5,930,143 | A | | 7/1999 | Savazzi |
| 2002/0059856 | A1 | * | 5/2002 | Smith ............................. 83/74 |

FOREIGN PATENT DOCUMENTS

| | | |
|---|---|---|
| DE | 199 42 980 A1 | 3/2001 |
| DE | 697 05 099 T2 | 2/2002 |

OTHER PUBLICATIONS

Germany Examination Report dated Jun. 26, 2008 (3 pages).

\* cited by examiner

*Primary Examiner* — Robert R Raevis
(74) *Attorney, Agent, or Firm* — Flynn, Thiel, Boutell & Tanis, P.C.

(57) ABSTRACT

A machine tool for chip removing machining operations on workpieces using tools comprises a tool checking device for checking a tool of the machine tool as regards damage or fracture by means of a sensor. There is a provision on the machine tool such that sensor is a contact-free sensor arranged on a movably disposed sensor holder, that the tool checking device possesses a drive for the sensor holder to shift the sensor toward and away from the tool to be checked and that the machine tool or the tool checking device possesses a control module for the control of the drive to perform a measuring excursion so that the drive shifts the sensor for a measurement of a tool to be checked for a measurement toward the tool and after the measurement shifts it away from the tool.

17 Claims, 4 Drawing Sheets

MACHINE TOOL HAVING A TOOL CHECKING DEVICE

The invention relates to a machine tool for chip removing machining operations on workpieces comprising a tool checking device for checking a tool of the machine tool as regards damage or fracture by means of a sensor.

The machine tool is for example a milling and/or turning machine. During the machining of workpieces damage to the tools may occur, for example fractures, cracking or the like.

Now it is for example possible to thrust the tool against the switching flag of a sensor in order to detect damage or fracture of the tool. In the case of a fractured tool no respective tool signal will be produced. The disadvantage is however that this method is to prone involve increased wear. Furthermore it would be possible to check the tool while being conveyed through a light barrier. If the tool is fractured, the light beam will not be interrupted. The tool must be exactly positioned in relation to the optical sensor, something which is difficult in the case of different tool lengths for example.

Accordingly one object of the present invention is to provide a simply performable tool checking method for the tools of a machine tool.

In order to attain this aim in the case of a machine tool of the type initially mentioned there is a provision such that the sensor is a contact-free sensor arranged on a movably disposed sensor holder, that the tool checking device possesses a drive for the sensor holder to shift the sensor toward and away from the tool to be checked and that the machine tool or the tool checking device possesses a control module for the control of the drive to perform a measuring excursion so that the drive shifts the sensor for a measurement of a tool to be checked for a measurement toward the tool and after the measurement shifts it away from the tool. Furthermore the invention contemplates a method in accordance with a further independent claim to attain the said aim.

The machine tool, which machines the workpiece by cutting, is for example a milling machine and/or a drilling machine and/or a turning machine.

The basic notion of the invention is to provide for contact-free tool checking so that there is no wear or only minimum wear. Furthermore the relatively light sensor is shifted, whereas the tool may remain at a single position. The processing times or measuring times of the tool checking device in accordance with the invention are brief so that the productivity of the machine tool is high. Events occurring within the machine are not interfered with the tool checking operation in accordance with the invention.

Preferably the method in accordance with the invention, which is also provided to achieve the invention's object, takes advantage of idle times of the machine in any case occurring, for example during tool changing, when a tool is already in the tool magazine or is on its way to the tool magazine or the like.

Tool checking in accordance with the invention preferably takes place clear of a working space of the machine tool provided for processing workpieces. Accordingly there is hardly any danger of soiling, more particularly of the sensor.

The tool checking device is preferably arranged on a conveying path of a tool conveying means, for example of a chain conveyor, of the machine tool for conveying tools from or to at least one working spindle. The tool conveying means conveys tools from for example a tool magazine to the working spindle or away from it.

The control of the drive for a measurement excursion in the respective idle times of the machine tool is an advantage.

The control module, as for example software able to be implemented by a storage programmable control of the machine tool, or a corresponding control hardware module, is preferably so designed that it controls the drive to perform measurement a during a pause in movement of the tool conveying means. This pause in movement may for example be the period in time between two movement strokes. The control module for example cooperates with the control of the tool conveying means or constitutes a component of a tool conveying means control.

The tool checking device is preferably disposed on or in a tool magazine. Accordingly the tool checking device is positioned clear of a working space of the machine tool for prevention of soiling. Furthermore it is also relevant here that the tool magazine comes to a halt, at least for a short time, so that the measurement in accordance with the invention may be implemented.

Preferably the sensor holder has a measuring chamber for the sensor. The sensor is preferably arranged in the measuring chamber or to the side thereof. The sensor is accordingly protected.

The measuring chamber is preferably arranged in a capsule housing which has an insertion opening for the introduction of the respective tool to be measured. It will be clear that the capsule housing can always have its entry opening open or furthermore a closure means, as for example a cover, may be placed here.

The sensor holder preferably has a forked configuration, the sensor being arranged on a first holding arm and a signal source being arranged on a second holding arm, which is opposite to the first holding arm, said signal source serving to produce a sensor exciting signal, which is able to be received by the sensor and serving for checking the tool. The sensor exciting signal may for example be a magnetic field, a light beam or the like. The measuring chamber is for example delimited by holding arms of the sensor holder or has holding arms.

In one measurement portion of the sensor a compressed air output or retained air outlet is preferably arranged, from which compressed air or retained air flows for cleaning a measurement portion assigned to the sensor. The issuing compressed air for example prevents dirt from entering the measuring chamber of the capsule housing. Any dirt already located in it is blown out again. The sensor in accordance with the invention may also readily be employed in the case of machine tools operating under wet conditions, in the case of which the objects to be measured, namely the tools, entrain cooling liquid into the measuring chamber. Air leaving the compressed air or retained air outlet will then clean the measuring chamber again.

The compressed air outlet is preferably arranged on the sensor holder. Accordingly the compressed air will always be available at the point needed. It will be clear that the compressed air outlet is however also stationary, i.e. may be positioned in an immovable manner or on a moving arm, which is separate from the sensor holder and if necessary is able to be shifted individually, it being convenient for the sensor holder to move during a measurement excursion, and preferably in the case of measurement as such, past the compressed air outlet so that cleaning occurs here. The cleaning of the measuring chamber can however take place remote from the measurement, as for example in a resting position of the sensor holder, if a compressed air outlet is positioned here stationarily.

The sensor holder may be a separate subassembly, which for example is arranged on an armature of the drive. It is however also possible for the sensor to be attached, for example to a holding assembly, which for its part is arranged on the armature of the drive. For instance the corresponding sensor holder may project from an armature of the corresponding sensor holder. It is however also possible for example for a carriage to be arranged on the armature of the drive, and on it for a sensor holder to be arranged for the sensor in accordance with the invention.

Preferably the sensor is mounted for linear motion. Owing to the possibility of linear setting of the sensor an optimum adaptation to different tool lengths is possible, i.e. the sensor is always able to be positioned in a optimum manner in the case of tools of different lengths with the aid of the movingly mounted sensor holder.

The drive is preferably a linear drive and in particular an electrical linear direct drive. It will be clear that a pneumatic drive is also possible. The linear direct drive serves to provide for extremely rapid movement so that the measurement may be completed within the shortest possible time. It is furthermore possible for a rotary drive such as a servo drive and a transmission, for example a linear module, to be provided for the conversion of a rotary movement of the rotary drive into a linear movement.

As an alternative it would also be conceivable for the drive also to be a rotating drive, which shifts the sensor into the measurement position or out of it again.

Preferably the sensor comprises an optical sensor, as for example a light barrier. The optical principle of measurement is more particularly convenient in the case of small tools, as for example those having a small diameter of less than 3 mm. The danger of soiling of an optical sensor is preferably countered by the action of compressed air or retained air, as mentioned above.

It will be clear that the sensor may also comprise an inductive sensor, which is less sensitive to dirt.

Furthermore it is possible for several contact-less sensors to be provided, as for example an optical sensor and an inductive sensor. Furthermore capacitive principles of measurement, ultrasonic measurement or the like are possible in accordance with the invention.

The machine tool is preferably a multi-spindle machine with two or more working spindles for machining a workpiece. Each working spindle is preferably provided with a sensor of the tool checking device. Accordingly several tools returning from use on the tool spindle or tools to be returned to it in the working position may be simultaneously checked. The tool conveying means is accordingly capable of high speed operation.

The invention contemplates having several sensors driven by a single drive, two sensors being f.i. operated y a single drive. Preferably however each sensor has an independently operated drive so that an individual positioning of the respective sensor is possible.

In the following a working example of the invention will be described with reference to the accompanying drawings.

Figure 1:
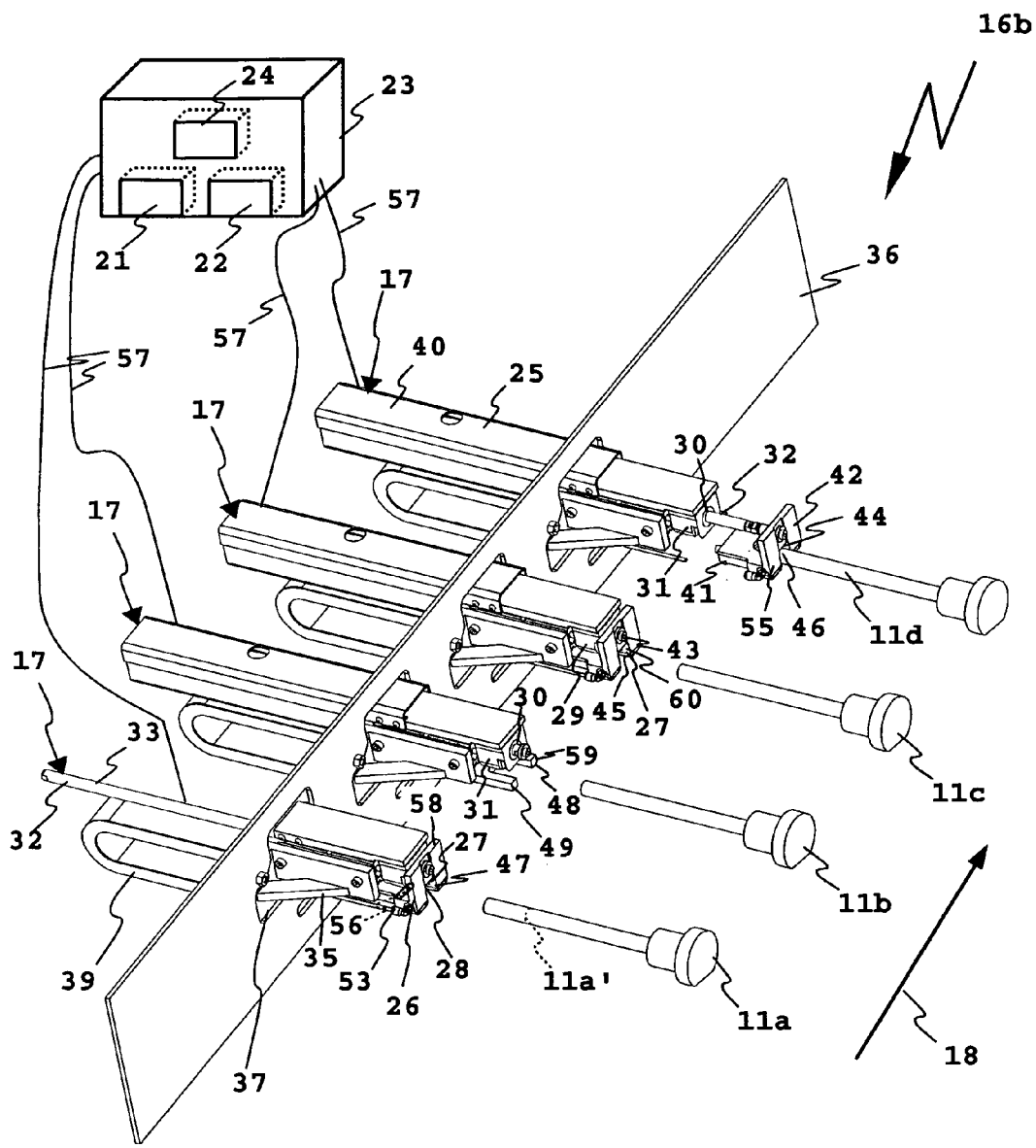
FIG. 1 shows a tool checking device in accordance with the invention with several checking means in different stages of the measurement method in accordance with the invention and respectively partially in an exploded view.
Figure 2:
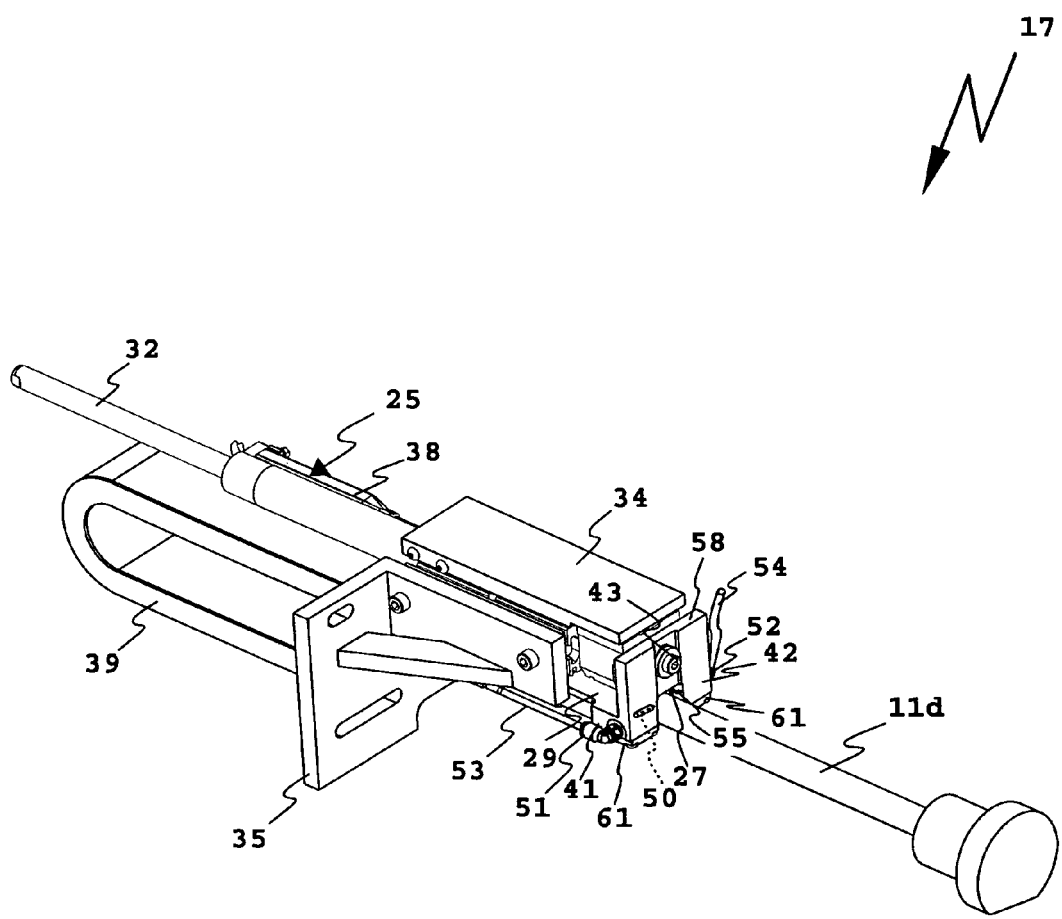
FIG. 2 shows a checking means in accordance with FIG. 1 in a separate elevation.
Figure 3:
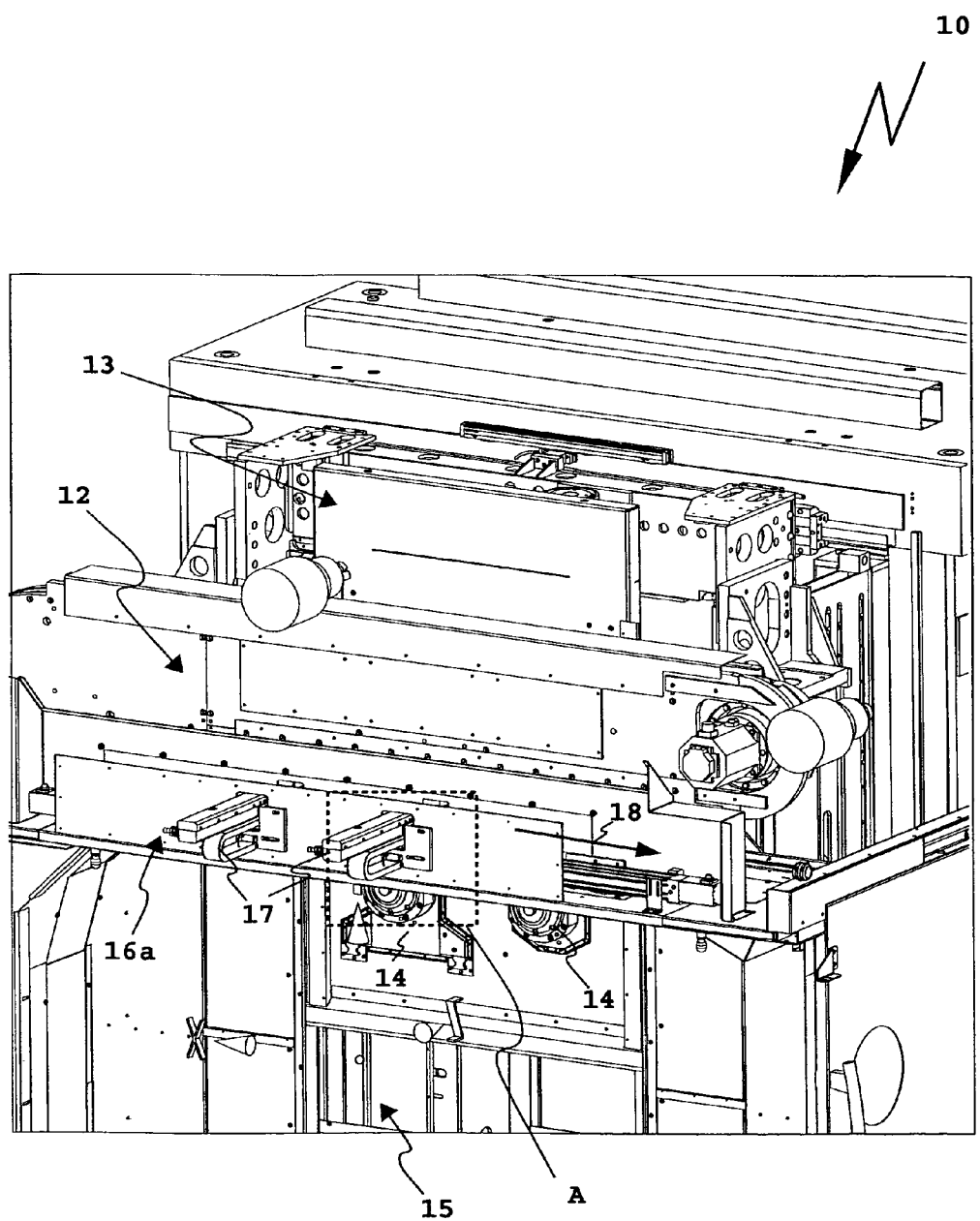
FIG. 3 shows a portion of a machine tool with a tool checking device having two checking means.

A machine tool 10 is designed for chip removing machining of workpieces, as for example castings or the like using tools 11a through 11d, for example milling heads, rotary lathe tools or the like.

A tool conveying means 12 conveys the diagrammatically represented tool 11a through 11d and further tools, not illustrated, from a tool magazine 13 to working spindles 14 of the machine tool 10, the tools being arranged on the shafts 14. Then the tools 11a through 11d are available for machining the workpieces in a working space 15 of the machine tool 10. The tool magazine 13 is placed above the working space 15.

The machine tool 10 is a multi-spindle machine with, in the present case, two working spindles 14. It will be clear that the concept of the invention explained in the following in detail is also advantageous in the case of single spindle machines or in the case of machines with more than two drives for tools. Thus for example the machine tool 10 is provided with a tool checking device 16a for the simultaneous checking of two tools 11a through lid with the aid of two checking means 17. A tool checking device 16b in accordance with FIG. 1 on the contrary for a four spindle machine tool (not illustrated in detail) has four tool checking means 17.

Preferably the checking means of a tool checking device in accordance with the invention, which can check several tools simultaneously, are arranged along the path of travel of a respective tool conveying means, which in the case of the working example is the tool conveying means 12. Thus for example the checking means 17 of the tool checking devices 16a and 16b are placed linearly adjacent to each other in accordance with a path 18 of movement of the tool conveying means 12, for example along a linear section of a path of travel of the tool conveying means 12. The tool conveying means 12 in the example comprises one chain conveyor 19.

It will be clear that in the case of a curved path of movement of the respective tool conveying means it is convenient to have an arrangement of the checking means which is also adapted to this curved path of movement.

The checking means 17 check the tools 11a through lid in the manner in accordance with the invention extremely rapidly and without prolonging the machining times or conveying times of the machine tool 10 to a noticeable or indeed any extent.

One reason for this is that the checking means 17 are disposed to the side of the working space 15 or remote from the working space 15 so that the checking of tools does not interfere with machining workpieces or lead to a delay in the machining of workpieces. Furthermore the checking means 17 lead to substantially less soiling of the arrangement.

The tool conveying means 12 may directly constitute the tool magazine 13, because tools 11a through 11d which are not needed or used and further tools, not illustrated, can be stored in the tool conveying means 12 in the interim, when they are not directly needed on the working spindles 14.

The tools 11a through 11d may dwell in the tool conveying means 12 during checking by the tool checking devices 16a and 16b, for example in tool sockets 20 of the chain conveyor 19. For operation cooperating with the tool checking devices 16a and 16b in accordance with the invention the tool conveying means 12 does not as such need any modification. However it is appropriate for a control module 21 of the tool checking devices 16a or 16b to cooperate with a conveyor control module 22 of the tool conveying means 12, i.e. for the two modules 21 and 22 to operate in synchronism and for this purpose preferably to swap control and/or measurement data. The control modules 21 and 22 are for example hardware components or software modules of a machine controller 23 of the machine tool 10. For instance the control modules 21 and 22 comprise program code able to be implemented by a processor 24 of the machine controller 23. The machine controller 23 is connected with the tool checking devices 16a and 16b and, respectively, the tool conveying means 12 via lead connections 57.

Figure 4:
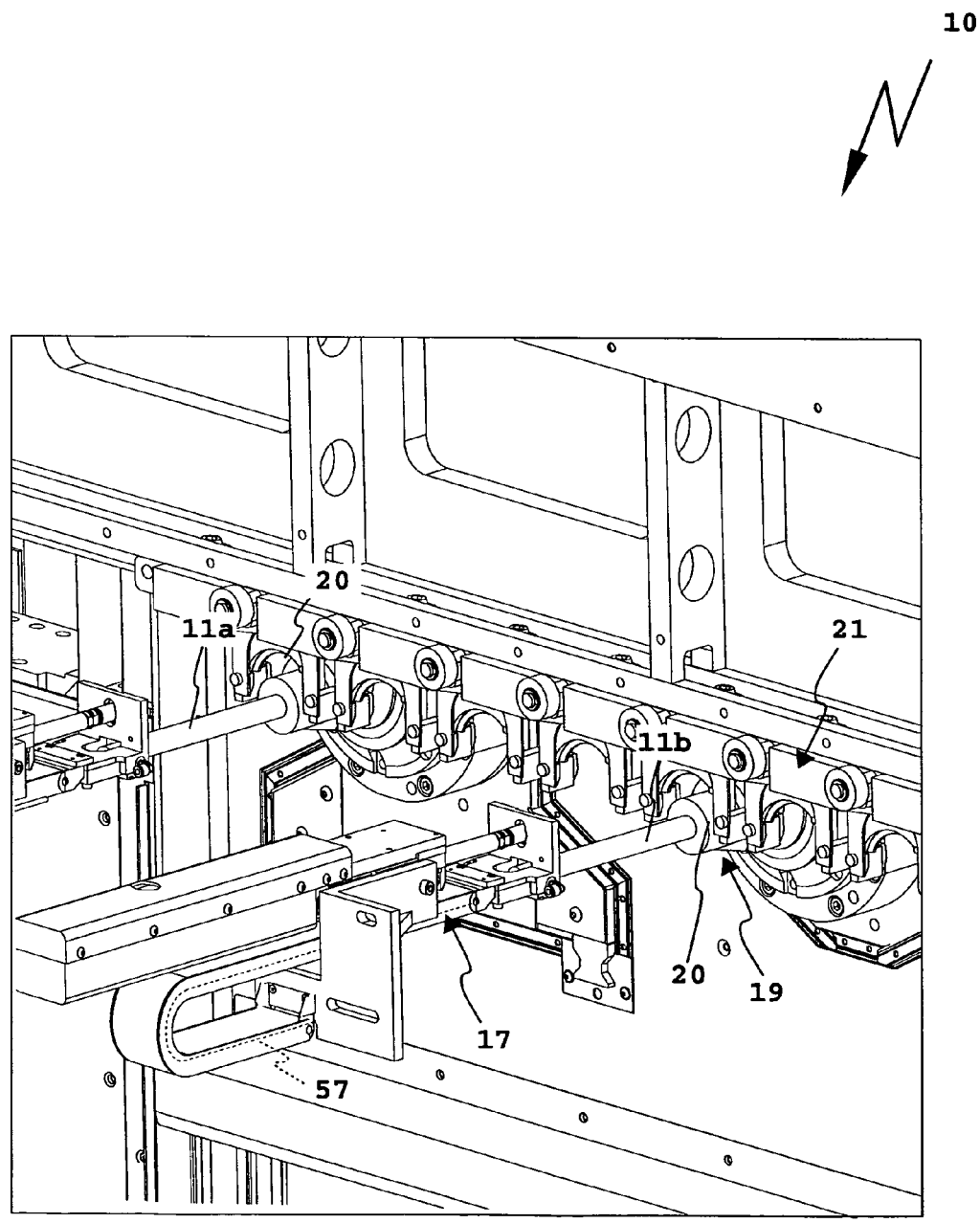
FIG. 4 is a view of a portion of the machine tool of FIG. 3 generally in accordance with a section A in FIG. 3.

The tool conveying means 12 and the tool checking device 16b cooperate together to the extent that during conveyance from the working space 15 to the tool magazine 13 or back again the tool conveying means 12 moves the tools 11a through 11d past the tool checking device 16b. It is here that a check on the tools 11a through 11d occurs as regards damage or fracture. For this purpose the tool conveying means 12 moves the respective tools 11a through 11d to be checked directly in front of the checking devices 17 so that same may perform the tool checking as described in the following. In the views of FIGS. 1 and 4 the tools 11a through 11d are respectively positioned opposite the checking means 17.

In this position a respective drive 25 will move a sensor 27, which is arranged on a moving sensor holder 26 and operates without making contact, toward the tool 11a through 11d to be checked, portions of the tools 11a through 11d to be checked, normally the free ends thereof, having at least one cutting edge or blade, is in a measurement portion 28 of each respective sensor 27.

The tool conveying means 12 does not partake in the positioning of the sensors 27. It would nevertheless be possible for a tool conveying means 12 to perform rough positioning, also athwart the path of movement toward and away from the respective working space or the tool spindle. In the working embodiment this arrangement might be such that the tools 11a through 11d travel at a right angle or obliquely to the path of movement 18 to be nearer to the checking means 17. This is however not mandatory.

With the aid of the drives 25 governed by the control module 21 the sensors 27 may be shifted toward the tools 11a through 11d, which during checking are stationary, and away from them again. In accordance with the principle of the invention in this case it is not the tools 11a through 11d but the relatively light sensors 27 which are positioned. Accordingly the tool checking devices 16a and 16b operate extremely rapidly and efficiently. In addition the drives 25 can position the sensors 27 exactly in place, something meaning for example a simplification in checking of tools 11a through 11d of different lengths. When for example one of the tools 11a through 11d is shorter (as indicated in the case of the tool 11a') the respective checking means 17 can move farther on to the front so that its measurement portion 28 is for example positioned at the front end of the tool 11a'.

The sensor holders 26 travel along linear guides 29 in a straight line. The linear guides 29 comprise a guide recess 30 on a guide element 31. The guide recesses 30, for example bushings, have armatures 32 of the drives 25 (which are in the form of linear drives) extending through them. The armatures 32 comprises armature rods 33 for example.

The drives 25 are held by drive holders 34, which for example are attached to mounting flanges 35. The mounting flanges 35 are in the example screwed to a sheet metal holder 36 of the tool checking devices 16a and 16b. The sheet metal holder 36 has openings 37 through it, through which the drives 25 extend from a back side of the sheet metal holder 36 to its front side, where the tools 11a through 11d to be checked are positioned. The flanges 35 extend through the openings 37 as well.

The drive holders 34 hold stators 38 of the drives 25 in relation to which the armatures 32 can move. The stators 38 constitute primary parts, and the armatures 32 constitute secondary parts of the drives 25 designed in the form of linear direct drive. The linear direct drive principle makes it possible for the drives to operate extremely rapidly. Accordingly tool checking is as well rapid and efficient.

In principle it would also be possible for the sensors 27 to be disposed directly on the armatures 32 so that the armatures would directly perform the function of a sensor holder. Furthermore it is not absolutely essential for linear guides 29 to be provided, since the armatures 32 are already guided by the stators 38. The linear guides 29 however improve the mechanical properties of the tool checking devices 17.

The sensor holders 26 comprise corner pieces 48 each having a bottom limb 41 extending in parallelism to the armature rod 33, and for example horizontally, and a vertical limb 42.

The sensor holders 26 are arranged on the front free ends, associated with the tools 11a through 11d to be checked, of the armatures 32. In the example a screw 43 extends through the vertical limb 42 and is screwed into the front end face of the armature rod 33. The limbs 41 and 42 delimit a measuring chamber 44, in which the respective sensor 27 is arranged.

The corner pieces 58 possess insertion openings 46, through which the tools 11a through 11d to be checked can be extended into the respective measuring chamber 44. The insertion opening 46 is constituted by a slot 47 extending over the corner between the limbs 41 and 42.

On holding arms 48 of a fork-like sensor support 59 there are for example the sensors 27 and, on holding arms 49 opposite to them, signal sources 50, in the present case sources of light, which produce stimulus signals for the sensors 27.

The holding arms 48 and 49 extend underneath the bottom horizontal limb 41 of the respective corner piece 58. The holding arms 48 and 49 are inserted into pocket-like sockets 60, which are delimited by the horizontal limbs 41 and cover plates 61 screwed onto them for example. The sockets 60 and open toward the measuring chamber 44 so that beams of light from the signal sources 50 may get to the sensors 27. The sensors 27 are arranged and protected in the interior of the sockets 60.

The sensor holders 26 and more particularly the sockets 60 constitute a sort of capsule housing 45 for the sensors 27.

The signal sources 50 and the sensors constitute light barriers. When the drives 25 shift the sensors 27 toward the tools 11a through 11d and their free ends to be checked enter the insertion opening 46, they interrupt a light beam coming from the signal sources 50, this being detected by the sensors 27. In the case of a tool fracture or a damage of a respective tool 11a through 11d the light beam of the signal sources 50 is not interrupted, this producing an error message.

The signal sources 50 and the sensors 27 are electrically connected with electrical leads 57, which run to the sensor holders 26, for example with the machine controller 23 and in particular with the control module 21. The control module 21 then preferably constitutes an analysis means for evaluation of the sensor signal supplied by the sensor 27.

The control modules 21 and 22 preferably so cooperate together that the tool measurements are performed in pauses in movement of the tool conveying means 12. When for example the tools 11a through 11d halt during conveying from the tool magazine 13 into the working space 15 or vice versa, f.i. during a tool change at the working spindles 14, the control module 21 will take advantage of this pause in movement to cause the drives 25 to perform a measurement excursion.

In accordance with a possible advantageous feature of the invention compressed air outlets 55 are arranged adjacent to the sensor holders 26 from machine tool compressed air or retained air is discharged. The compressed air prevents dirt from entering the measuring chambers 44. The compressed air or the retained air may be provided for cleaning the measuring chambers 44. Such dirt may for example be chips, cutting liquid or the like, fouling the tools 11*a* through 11*d* to be checked and entrained into the measuring chambers 44. The compressed air leaving through the compressed air outlets 55 is for example conducted via compressed air ducts 53 and 54, as for example flexible pipe ducts, to pneumatic ports 51 and 52 of the sensor holders 26.

The compressed air flows in parallelism to the light beams from the signal sources 50 into the sockets 60 open toward the measuring chamber 44. The sockets 60 constitute flow ducts for the compressed air.

Underneath the drives 25 there are flexible line supports 39, which bear electrical and/or optical signal and power lines and preferably also pneumatic lines 53 and 54 and the line connections 57. The line supports 39 are U-like and are at one end attached to the mounting flanges 35 and at the other end are attached to the respective sensor holder 26. The line supports 39 take part in the movement of the drives 25.

The checking means 17 may comprise inductive sensors 56, employed instead of the optical sensors 27 or working in addition to them.

The invention claimed is:

1. A machine tool for chip removing machining operations on workpieces using tools, the machine tool comprising a tool checking device for checking a tool of the machine tool for damage or fracture with a sensor, the sensor being a contact-free sensor and arranged on a movably disposed sensor holder, the tool checking device possesses a drive for the sensor holder which moves the sensor toward and away from the tool to be checked, and the machine tool or the tool checking device possesses a control module for the control of the drive to perform a measuring excursion so that the drive moves the sensor toward the tool to be checked for a measurement of the tool and, after the measurement of the tool, the drive moves the sensor away from the tool, wherein the control module controls the drive to perform the measuring excursion in respective idle times of the machine tool and the tool checking device is arranged on a conveying path of a tool conveyor for conveying tools toward and away from at least one working spindle of the machine tool such that the tools are spaced and separate from the at least one working spindle during the measurement.

2. The machine tool in accordance with claim 1, wherein the tool checking device is arranged clear of a working space, provided for processing workpieces, of the machine tool.

3. The machine tool in accordance with claim 1, wherein the control module controls the drive to perform the measuring excursion during a pause in movement of the tool conveyor.

4. The machine tool in accordance with claim 1, wherein the tool checking device is arranged on or in a tool magazine.

5. The machine tool in accordance with claim 1, wherein the sensor holder has a measuring chamber for the sensor.

6. The machine tool in accordance with claim 5, wherein the measuring chamber is arranged in a capsule housing having an insertion opening for the introduction of the tool to be measured.

7. The machine tool in accordance with claim 1, wherein the sensor holder has holding arms comprising a first holding arm and a second holding arm, with the sensor being arranged on the first holding arm and a signal source arranged on the second holding arm opposite to the first holding arm, the signal source providing a sensor stimulation signal which is received by the sensor to check the tool.

8. The machine tool in accordance with claim 1, wherein a compressed air outlet is arranged in a measurement portion of the sensor and from such air outlet compressed air issues for cleaning a measurement portion associated with the sensor.

9. The machine tool in accordance with claim 8, wherein the compressed air outlet is arranged on the sensor holder.

10. The machine tool in accordance with claim 8, wherein the compressed air outlet is arranged in or on a measuring chamber, compressed air issuing from the compressed air outlet cleaning the measuring chamber and/or reducing or preventing an ingress of dirt.

11. The machine tool in accordance with claim 1, wherein the drive has the sensor holder thereon.

12. The machine tool in accordance with claim 1, wherein the drive is a linear drive.

13. The machine tool in accordance with claim 12, wherein the linear drive is an electrical linear direct drive.

14. The machine tool in accordance with claim 1, wherein the sensor comprises an optical sensor.

15. The machine tool in accordance with claim 1, wherein the sensor comprises an inductive sensor.

16. The machine tool in accordance with claim 1, wherein the sensor is a first sensor and the tool checking device includes a second sensor of the same type as the first sensor, the machine tool is a multi-spindle machine including a first working spindle provided with the first sensor of the tool checking device and a second working spindle provided with the second sensor of the tool checking device.

17. The machine tool in accordance with claim 16, wherein each of the first and second sensors is provided with an independently operated drive.

\* \* \* \* \*